(12) United States Patent
Hall et al.

(10) Patent No.: US 10,458,449 B2
(45) Date of Patent: Oct. 29, 2019

(54) COMPRESSION ADJUSTMENT MECHANISM FOR HEADRAIL

(71) Applicant: Hall Labs LLC, Provo, UT (US)

(72) Inventors: David R. Hall, Provo, UT (US); Emily Brimhall, Alpine, UT (US); Seth Myer, Eagle Mtn., UT (US); Joe Fox, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 80 days.

(21) Appl. No.: 15/591,804

(22) Filed: May 10, 2017

(65) Prior Publication Data

US 2018/0328105 A1    Nov. 15, 2018

(51) Int. Cl.

| | | |
|---|---|---|
| *E06B 9/32* | (2006.01) |
| *F16B 1/00* | (2006.01) |
| *F16B 47/00* | (2006.01) |
| *F16M 13/02* | (2006.01) |
| *F16B 2/04* | (2006.01) |
| *E06B 9/266* | (2006.01) |
| *E06B 9/323* | (2006.01) |
| *F16B 2/18* | (2006.01) |

(52) U.S. Cl.
CPC ............... *F16B 2/04* (2013.01); *E06B 9/266* (2013.01); *E06B 9/323* (2013.01); *F16B 1/00* (2013.01); *F16B 2/185* (2013.01); *F16B 47/003* (2013.01); *F16B 2001/0035* (2013.01)

(58) Field of Classification Search
CPC .... E06B 9/323; F16B 1/00; F16B 2/04; F16B 2/185; F16B 47/003; F16B 2001/0035
USPC ............. 248/200.1, 265, 269, 270, 271; 160/168.1 R, 173 R, 178.1 R, 107, 123, 160/263, 902
See application file for complete search history.

(56) References Cited

U.S. PATENT DOCUMENTS

| | | | | |
|---|---|---|---|---|
| 4,373,569 A * | 2/1983 | Barettella | ................. | E06B 9/44 160/263 |
| 4,444,239 A * | 4/1984 | Haines | ...................... | E06B 9/30 160/107 |
| 6,722,414 B2 * | 4/2004 | Nien | ........................ | A47H 1/13 160/123 |
| 7,549,615 B2 * | 6/2009 | Shevick | .................. | E06B 9/266 160/168.1 R |
| 9,670,722 B1 * | 6/2017 | Hall | ........................ | E06B 9/323 |
| 2014/0086676 A1 * | 3/2014 | Coker | ..................... | E06B 9/323 403/326 |
| 2017/0362889 A1 * | 12/2017 | Hall | ........................ | F16B 2/04 |

* cited by examiner

*Primary Examiner* — Tan Le

(57) ABSTRACT

In various example embodiments, an apparatus for installing a window covering is disclosed. A rotational cam member is provided for extending a first piston on one side of a headrail and compressing a second piston on the opposite side of the headrail between a window casing. A lever arm is provided for rotating the rotational cam. Spacers are provided to adjust the compression of the apparatus, along with indicators indicating whether spacers need to be added or removed. Easy installation of a window covering headrail may be achieved as one arm is used to hold the headrail while the other hand is able to actuate the lever arm. Mounting brackets are provided for easy window covering removal after installation.

20 Claims, 14 Drawing Sheets

COMPRESSION ADJUSTMENT MECHANISM FOR HEADRAIL

BACKGROUND

Field of the Invention

This invention relates to systems and methods for installing window coverings and other window coverings.

Background of the Invention

Window coverings and other similar window coverings are typically installed in windows using mounting brackets that are screwed into the upper corners of window casings. Although effective, this installation technique may require a user to make measurements to ensure that the brackets are installed in the correct locations, as well as require tools (e.g., drills, screwdrivers, etc.) to drive the screws into the window casing. Unfortunately, this installation technique may also leave unsightly holes in the window casing and potentially damage the paint or finish thereon. This installation technique can also be quite time consuming. In a home or building containing many windows to be outfitted with window coverings or other window coverings, the installation time may increase accordingly.

In order to reduce the amount of time and/or effort needed to install window coverings, installation techniques have been developed. One such technique involves placing spring-loaded mounting brackets at the end of a window covering headrail. When the window covering headrail is placed into a window casing, the spring-loaded mounting brackets are released to provide a compression fit between the window covering and the window casing. Unfortunately, in some cases, such springs may generate insufficient force to secure the window covering to the window casing, particularly with long or heavy window coverings. This can result in movement or creep of the window covering relative to the window casing allowing the window covering to become dislodged or even fall.

Since in most cases, the headrail of a window covering does not exactly fit a given window casing. The ability to adjust the amount of compression of the headrail to assure that there is enough compression to keep the headrail in place is also needed.

In view of the foregoing, improved systems and methods to securely install window coverings in window casings, adjusting the compression to fit the window casing is needed. Ideally, such systems and methods will eliminate and/or reduce the need for tools when installing window coverings. Such systems and methods will also ideally eliminate and/or reduce the need for screws or other fasteners when installing window coverings.

SUMMARY

This invention has been developed in response to the present state of the art and, in particular, in response to the problems and needs in the art that have not yet been fully solved by currently available systems and methods. Accordingly, improved systems and methods have been developed to install window coverings. Features and advantages of different embodiments of the invention will become more fully apparent from the following description and appended claims, or may be learned by practice of the invention as set forth hereinafter.

Consistent with the foregoing, an apparatus for installing a headrail of a window are disclosed. The apparatus includes one or more end cap assemblies attached to one or more ends of the headrail of the window covering.

Each end cap assembly also includes one or more rotational members to, upon rotation, extend one or more pistons of the one or more end cap assemblies, extending the overall length of the headrail and end cap assemblies, creating a compression fit between the headrail and two sides of a window casing;

Within the end cap assemblies there is also included one or more nesting spacers allowing adjustment of headrail length; along with one or more spacer alignment structures providing a channel aligning the one or more nesting spacers;

In an embodiment, a first alignment indicator on one or more of the end cap assemblies indicating the headrail is under a low compression state requiring adding one or more nesting spacers is provided; along with a second alignment indicator on one or more of the end cap assemblies indicating the headrail is within a medium compression range not requiring addition or removal of the nesting spacers; and a third alignment indicator on one or more of the end cap assemblies indicating the headrail is under a high compression state requiring adding one or more nesting spacers.

As the cam is rotated a window covering headrail is installed. The rotational cam may be rotated by a lever arm attached to the cam. The one or more end cap assemblies may interface with mounting brackets by magnetic force. One or more magnets may be attached to the pistons of the one or more end cap assemblies. The mounting bracket may have one or more adhesive strips, spikes, barbs, or cleats protruding in different directions on each mounting bracket. The mounting bracket may be made of ferrous material. Spacers may be used in connection with the one or more end cap assemblies to lengthen a headrail to allow proper installation of a headrail in a window casing. The pistons of the one or more end cap assemblies may include marks or indicia for detecting a properly sized and installed window covering.

A rotational cam member is provided for extending one or more pistons on one or more sides of a headrail and compressing the headrail between a window casing. A lever arm is provided for rotating the rotational cam. Easy installation of a window covering headrail may be achieved as one arm is used to hold the headrail while the other hand is able to actuate the lever arm. Mounting brackets are provided for easy window covering removal after installation.

In certain embodiments, the first alignment indicator, second alignment indicator, and third alignment indicator visibly show the compression of the headrail by the one or more end cap assemblies partially obscuring one or more of the alignment indicators, revealing one or more indicators based on the amount of compression of the headrail and end cap assemblies.

In an embodiment, the first alignment indicator, second alignment indicator, and third alignment indicator each include a unique audible indicator.

In another embodiment, the assembly includes a first end cap assembly attached to a first end of a headrail of the window covering; a second end cap assembly attached to a second end of the headrail of the window covering; and the first end cap assembly further including a rotational member to, upon rotation, extend a piston of the first end cap assembly against a first side of a window casing creating a compression fit between the headrail and two sides of a window casing.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION OF THE DRAWINGS

The description that follows includes systems, methods, and techniques that illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

Figure 1A:
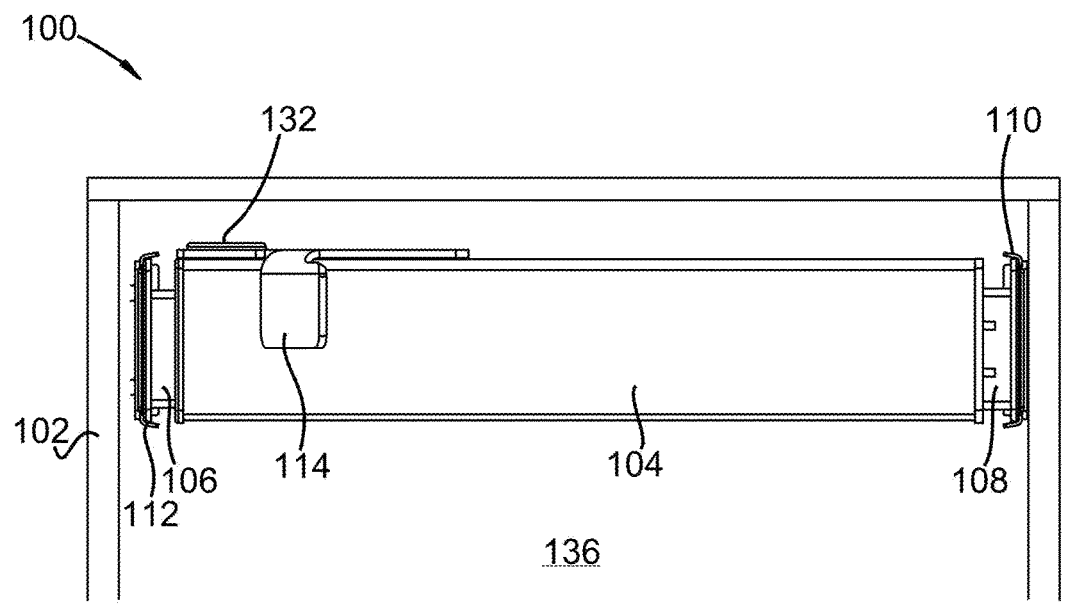
FIG. 1A is a front view of one embodiment of a window covering headrail uninstalled with a lever arm in an uninstalled position.

Referring to FIG. 1A, a front view 100 of an uninstalled window covering 136 with headrail 104, a first end cap assembly 106 and a second end cap assembly 108. The first end cap 106 assembly is coupled to a first end of head rail 104 and the second end cap assembly 108 is coupled to a second end of headrail 104. The second end cap assembly 108 and the first end cap assembly 106 are configured to retain the headrail 104 within a window casing 102 by creating a compression fit between the headrail 104 and the window casing 102. The first end cap assembly 106 is configured to extend a piston relative to the second end cap assembly 108 of the headrail 104 in order to create a compression fit against the inside of the window casing 102. Lever arm 114 may be connected to a rotational cam member 132 with in the first end cap assembly. Lever arm 114 is shown in an open position or uninstalled position. When lever arm 114 is in an open position, the second end cap assembly 108 is not compressed and the first end cap assembly is not extended.

Figure 1B:
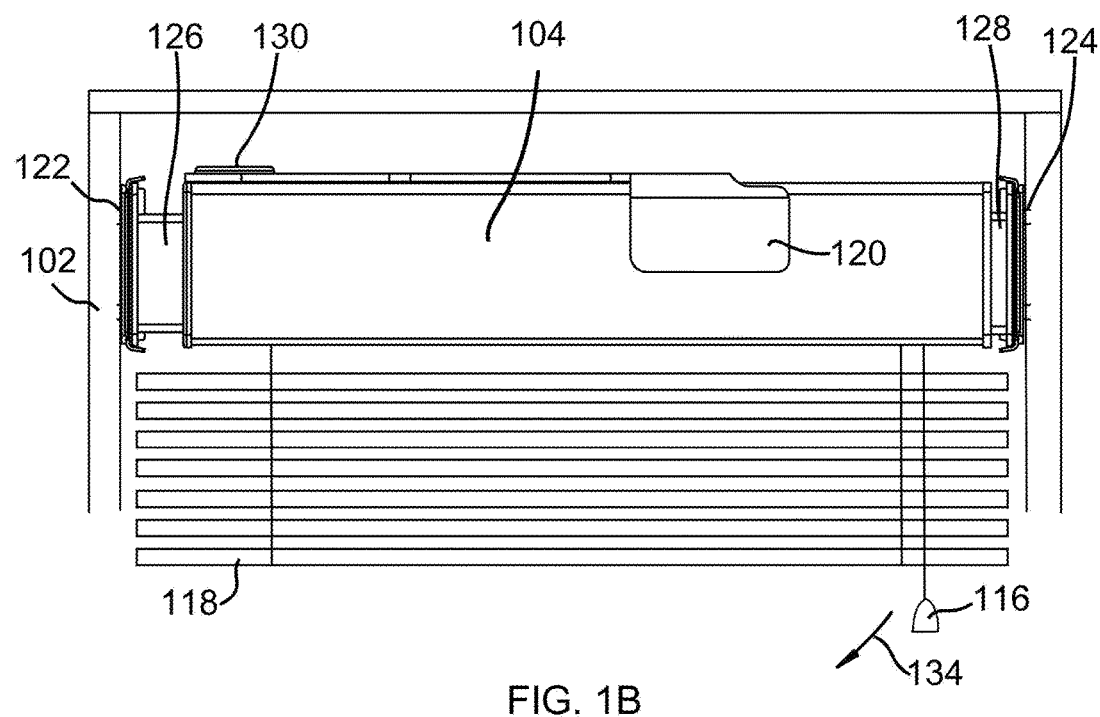
FIG. 1B is a front view of one embodiment of a window covering headrail installed with a lever arm in an installed position.

In FIG. 1B, when headrail 104 is initially installed, mounting brackets 122 and 124 may be held to pistons 126 and 128 by magnetic force. One or more magnets may be embedded within a face of the pistons to hold the mounting brackets in place while the headrail is installed. This allows a person to hold the headrail in one hand and move lever 120 with the other hand to easily install headrail. In FIG. 1B, headrail is in an installed position with lever arm 120 being in a position which is substantially parallel with the headrail 104. After the headrail is installed, mounting brackets 122 and 124 may become attached to the window casing allowing headrail 104 to slide in a forward direction out of the mounting brackets when the installation lever is in position 114 shown in FIG. 1A. The present invention provides a secure headrail that will not fall when force is applied to drawstring 116 in a direction 134 as the blinds are lifted or lowered. The first end cap assembly 106 forms a solid connection with the window casing 102 when lever 120 is substantially parallel to headrail 104.

Figure 2:
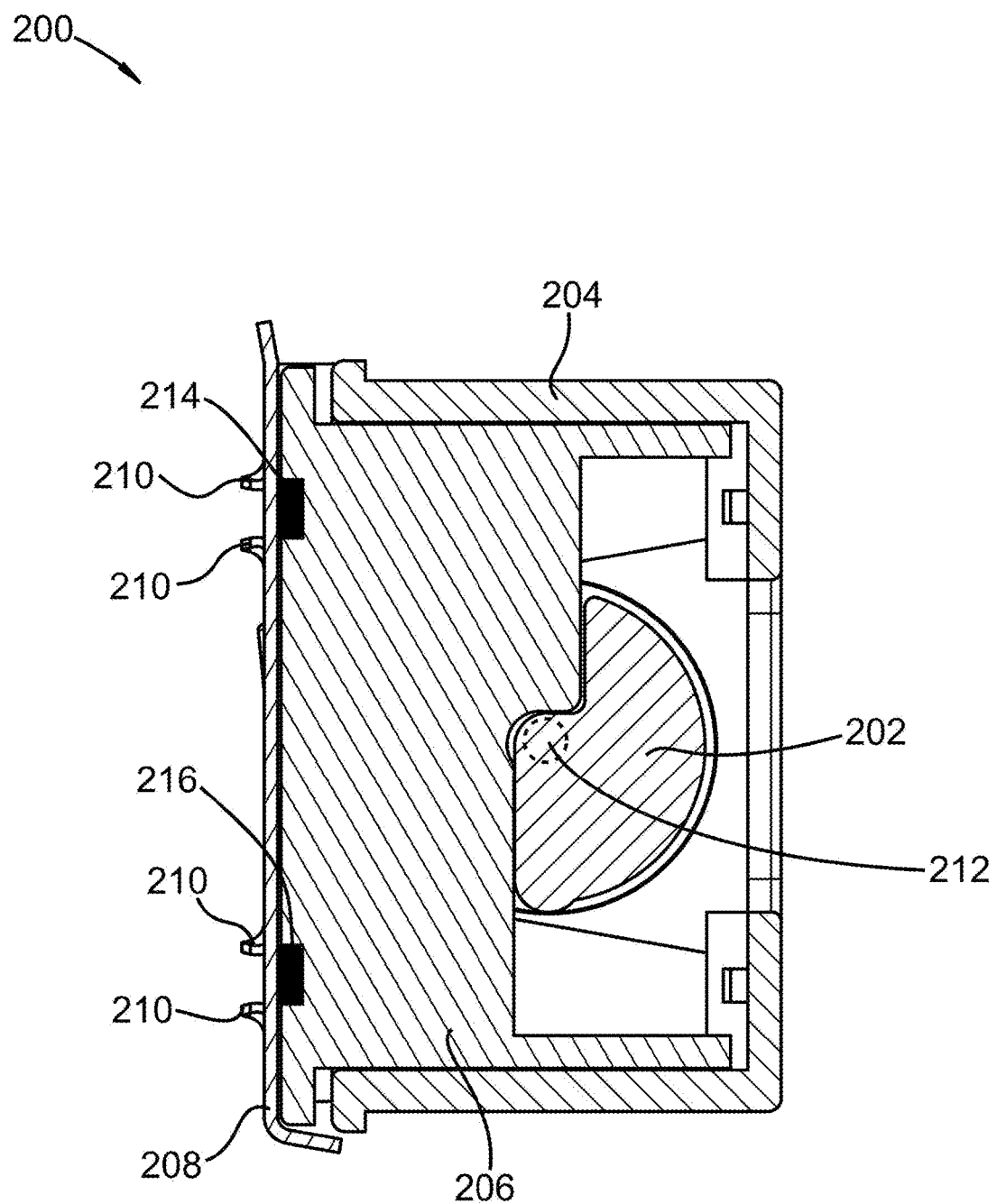
FIG. 2 is a cross-sectional view of an end cap assembly with a rotational cam in accordance with an embodiment of the invention.

In FIG. 2, a cross-section 200 of a first end cap assembly (with cross-hatching) is shown. As shown, the end cap assembly contains an outer member 204, a first piston 206, a cam member 202, and a mounting bracket 208. The piston 206 moves or extends outward as cam 212 is rotated. As cam member 202 is rotated around an axis of rotation 212, cam member 202 pushes piston member 206 away from outer member 204 resulting in an extension of piston 206. Outer member 204 may, in certain embodiments, slide into an end of the headrail 220. In other embodiments, outer member 204 slides over the end of the headrail, such as in cases where the end of the headrail is closed. The end cap assembly may be sized to fit snugly within the headrail. The end cap assembly may also be provided in different sizes to accommodate headrails of different dimensions. In other embodiments, the end cap assembly may include different adapters to fit different sizes of headrails, thereby allowing a uniform-size end cap assembly to be installed in different size headrails. One or more magnets 214 and 216 may be embedded into piston 206 or be near a front surface of piston 206. The magnets 214 and 216 may be used to attract and hold, by magnetic force, mounting bracket 208 while the headrail is installed. Mounting bracket 208 may include protrusions for entering a surface of a window casing. The protrusions may be spikes 210, barbs 210, or cleats 210.

Figure 3A:
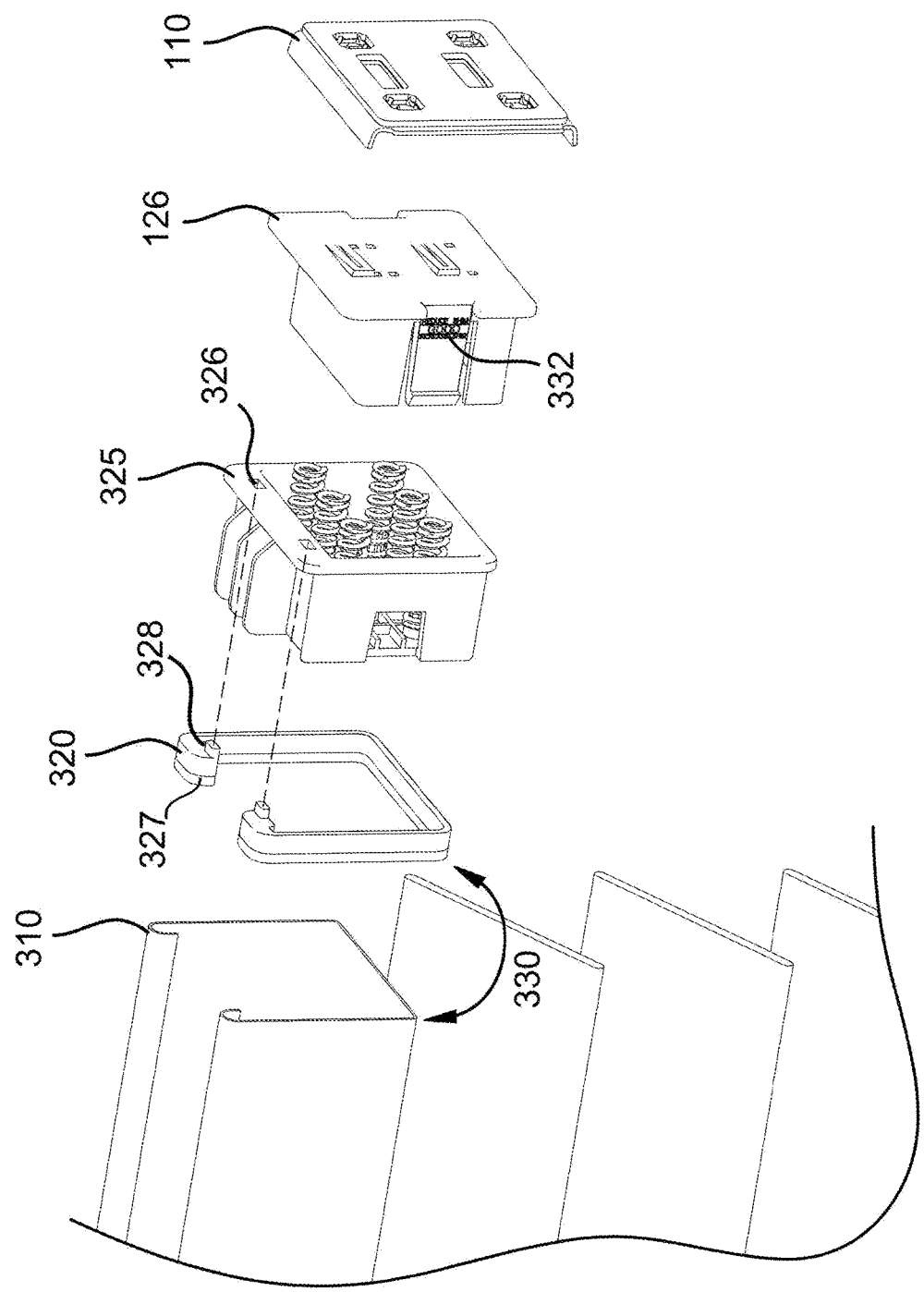
FIG. 3A is an isometric view of the various parts of the end cap assembly next to a headrail, in accordance with an embodiment of the invention.

FIG. 3A is an isometric view of the various parts of the end cap assembly next to a headrail 310. One or more spacers 320 are slid onto the outer body 325 of the end cap assembly, with protrusions 328 on the spacer 320 aligning to slots 326 on the outer body 325. Each spacer has a slot 327 on the back of the spacer allowing additional spacers to nest and align to each other. The substantially U shape of each spacer is configured to align to the outer body 325 and the headrail 310, the outer body acting as a channel directing the spacers onto the outer body 325, aligning them in order to have a tight connection for the compressive forces to apply forces to. Spacer 320 and all other nested spacers act as one unit once they are nested and slid onto the outer body 325. Spacer 320 nests and attaches 330 into headrail 310 to form a similar unified assembly. Plunger 126 inserts into outer body 325, and alignment indicators 332 are visible to the user or installer of the headrail 310.

Figure 3B:
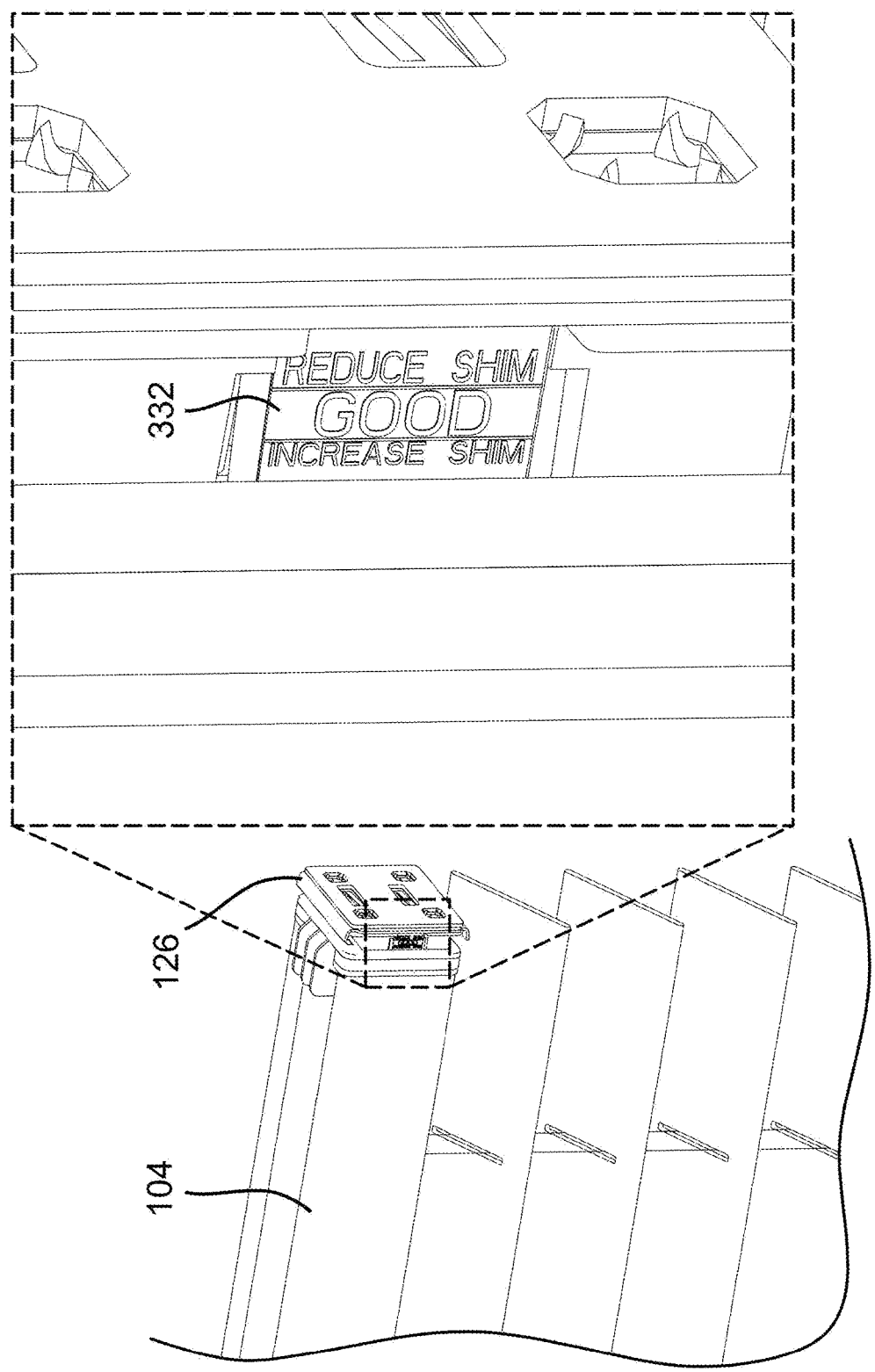
FIG. 3B is an isometric view of a headrail with an end cap assembly, and an enlarged view of the alignment indicators, according to an embodiment of the invention.

FIG. 3B is an isometric view of a headrail 104 with an end cap assembly, and an enlarged view of the alignment indicators 332. In this example, the header 104 has not yet been installed into a window casing, and plunger 126 has not yet been compressed. In this position, all three of the alignment indicators are visible to the user. Once the headrail is installed and the lever arm compresses plunger 126, if all three alignment indicators are still visible, then additional spacers will need to be added. The term "increase shim" indicates that one or more shim or spacer must be installed.

Figure 3C:
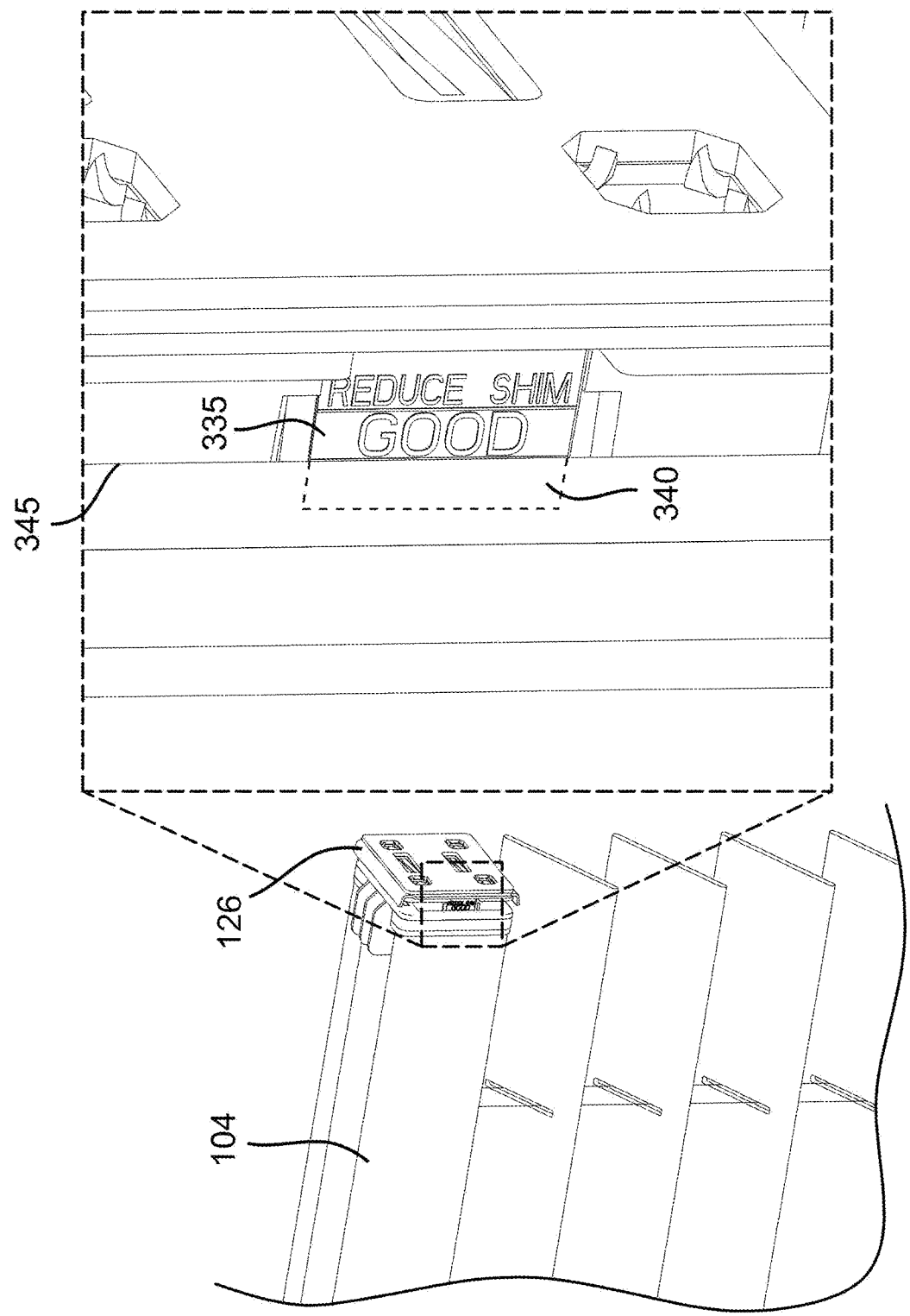
FIG. 3C is an isometric view of another example embodiment of headrail, and an enlarged view of the alignment indicators, according to an embodiment of the invention.

FIG. 3C is an isometric view of another example embodiment of headrail 104 with an end cap assembly, and an enlarged view of the alignment indicators 332. In this example, the headrail 104 has been installed and plunger 126 is fully compressed. In this case, the edge of the end cap assembly partially covers the indicator range, hiding the term "increase shim". In this example, no shims must be added since the term "good" is visible, indicating that the compression is within the recommended range.

In another embodiment, if too many shims are added, the term "good" will also be hidden, and the only visible term is the "reduce shim" indicator. In this case, one or more spacers must be removed before installing the header 104.

Figure 4A:
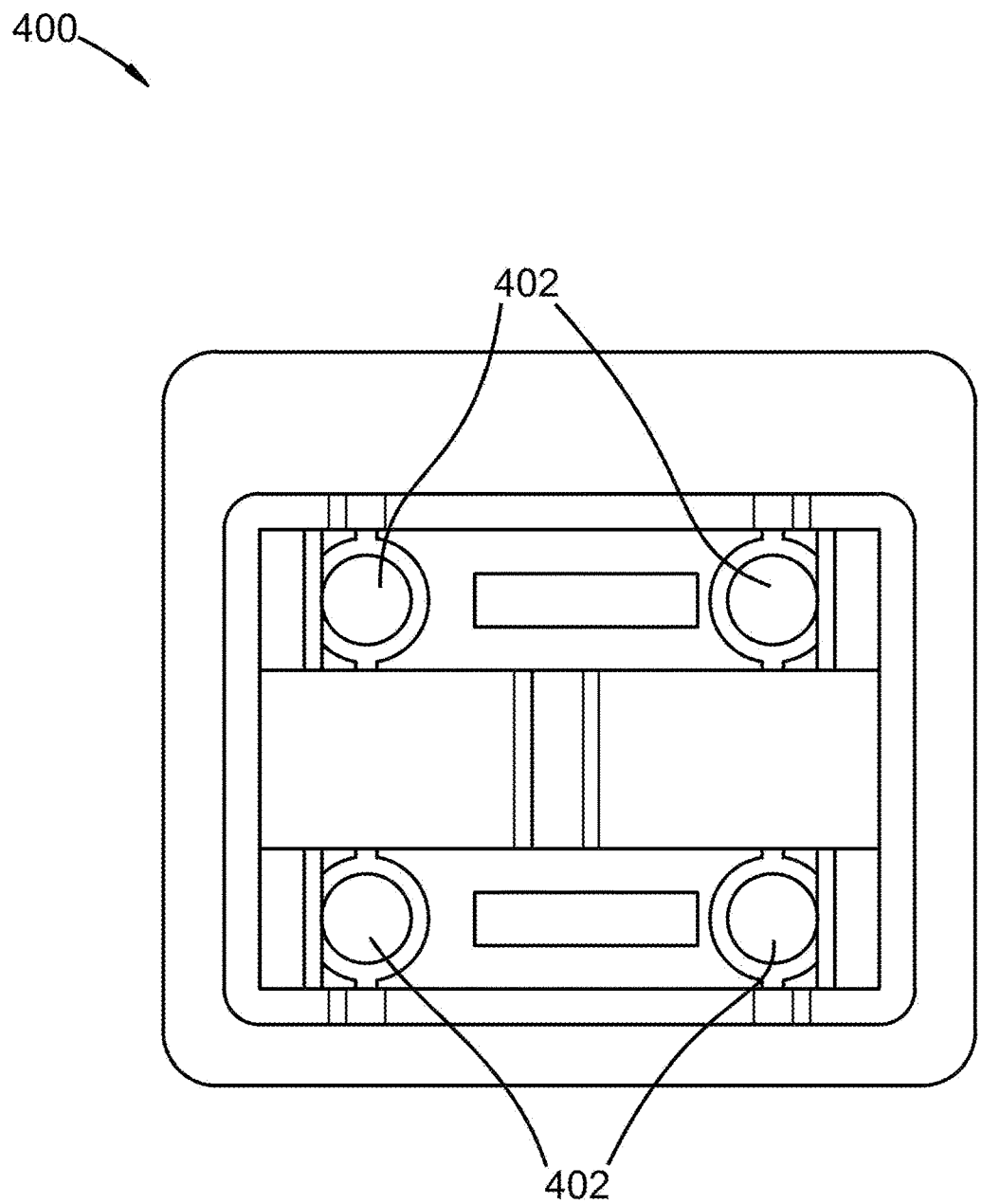
FIG. 4A is a front view of magnets within an end cap assembly in accordance with an embodiment of the invention.

FIG. 4A shows a view of magnets 402 positioned within a first or second end cap assembly 400. The magnets 402 may be planer, recessed, or embedded within a front face of a first and second end cap assemblies. The magnets 402 on each first and second end cap may be used to hold a first and second mounting bracket 300 as shown in FIG. 3 while a headrail is installed.

Figure 4B:
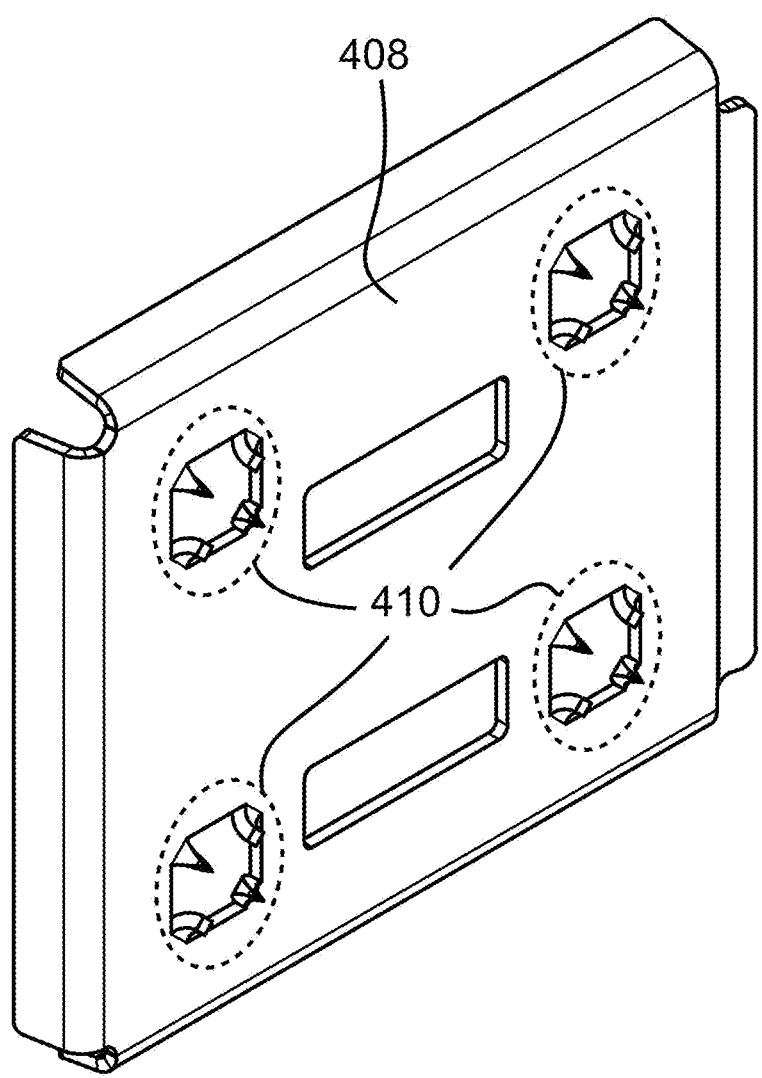
FIG. 4B shows a mounting bracket with end cap assemblies in accordance with an embodiment of the invention.

FIG. 4B shows a mounting bracket 408 which attaches to both the first and the second end cap assemblies. The bracket 408 may have three sides which are formed by bending 90 degrees allowing the headrail to slide in on the non-bend side. Mounting bracket 308 may include protrusions 410 for entering a surface of a window casing. The protrusions may be spikes 410, barbs 410, or cleats 410. The protrusions may be grouped in groups of four 410 as shown. The protrusions within each group may be oriented in different positions relative to each other.

Figure 5:
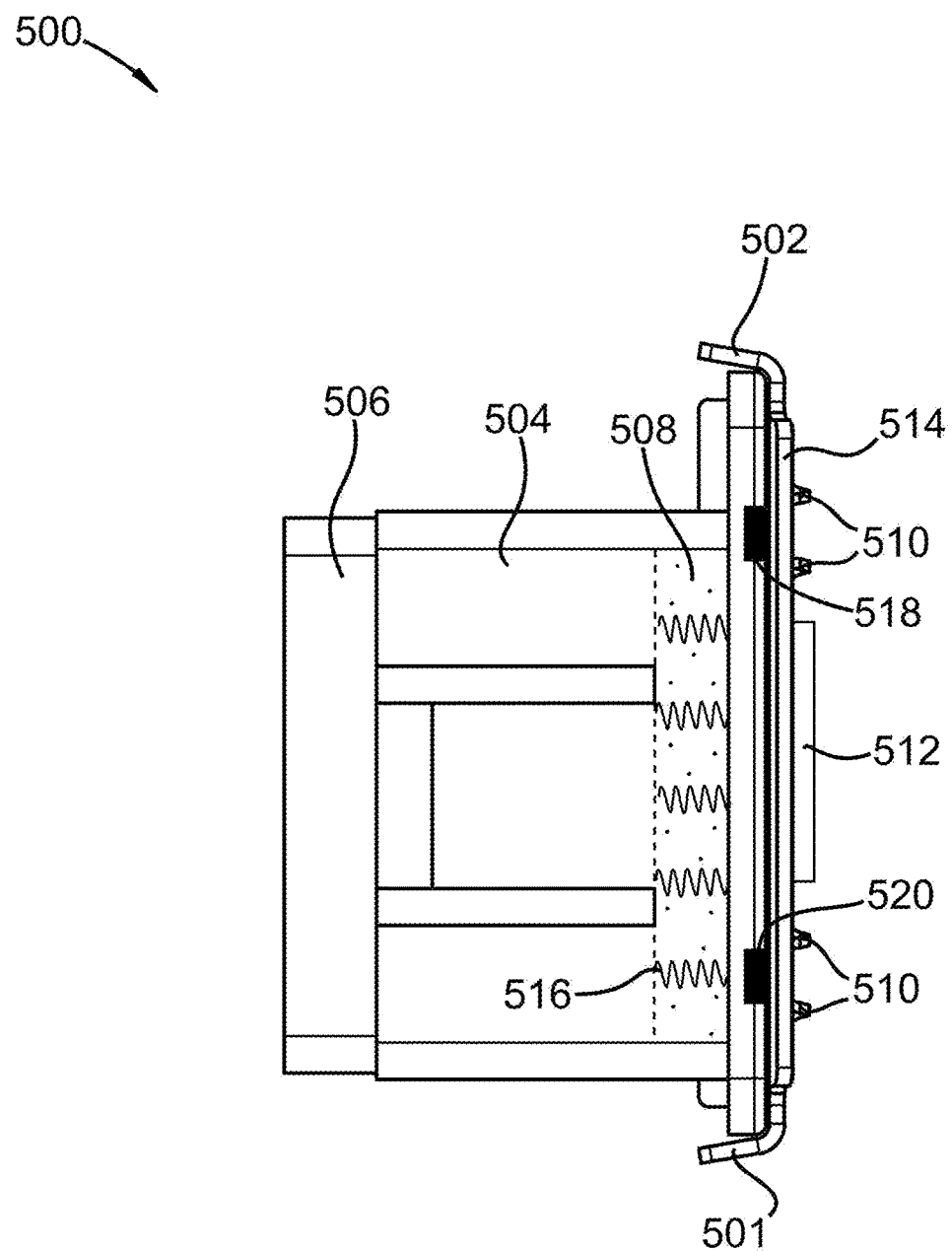
FIG. 5 shows a cross-sectional view of an end cap assembly with one or more compressible members in accordance with an embodiment of the invention.

As shown in FIG. 5, a second end cap assembly 500 has a mounting bracket 502 installed with protrusions 510 for entering a surface of a window casing. The protrusions may be spikes 510, barbs 510, or cleats 510. Mounting bracket 502 is attached to the second end cap assembly 500 by a magnetic force of magnets 518 and 520. Mounting bracket 502 allows a window covering headrail to be removed and reinstalled after its initial installation. A corresponding mounting bracket 208 of FIG. 2 may be provided on a first end cap assembly 206 on an opposite side of the window covering headrail 104. The mounting bracket 502 may, in certain embodiments, be coated with an adhesive 512. When installing a window covering headrail 104 in a window casing 102, the mounting bracket 502 may be adhered to the window casing at a desired location. A lever arm rotational member 800, of FIG. 8, may then be rotated to create a compression fit between the window covering headrail 104 and the window casing 102. This will press the adhesive 512 against the window casing 102 to improve the bond therebetween. The adhesive 512 in combination with the spikes 510, barbs 510, or cleats 510 may improve the bond with the window casing 102. Once the mounting bracket 502 is attached to the window casing 102, the window covering headrail with the first and second end cap assemblies may be removed from the window casing by simply sliding the headrail out of the mounting brackets 502 when the cam is in a rotationally uninstalled position. The mounting brackets 502 may stay in place on the window casing 102. The window covering headrail may be reinstalled by simply sliding the window covering back into the mounting brackets 502 and rotating the cam into an installed rotational position. The second end cap assembly 500 is made to compress under pressure. Compression members 508 and/or 516 may compress under pressure allowing a second piston 506 to move relative to outer portion 504. One or more compressible members 508 and 516 may be selected from one or more of springs, foam, compliant springs, pistons, or compressible material. Compress happens when the rotational cam (in the first end cap assembly in FIGS. 7 and 9) is rotated to an installed position forcing the first piston in the first end cap assembly to push against a first inside surface of a window casing and causing the second piston in the second end cap assembly to compress against a second inside surface of a window casing.

Figure 6:
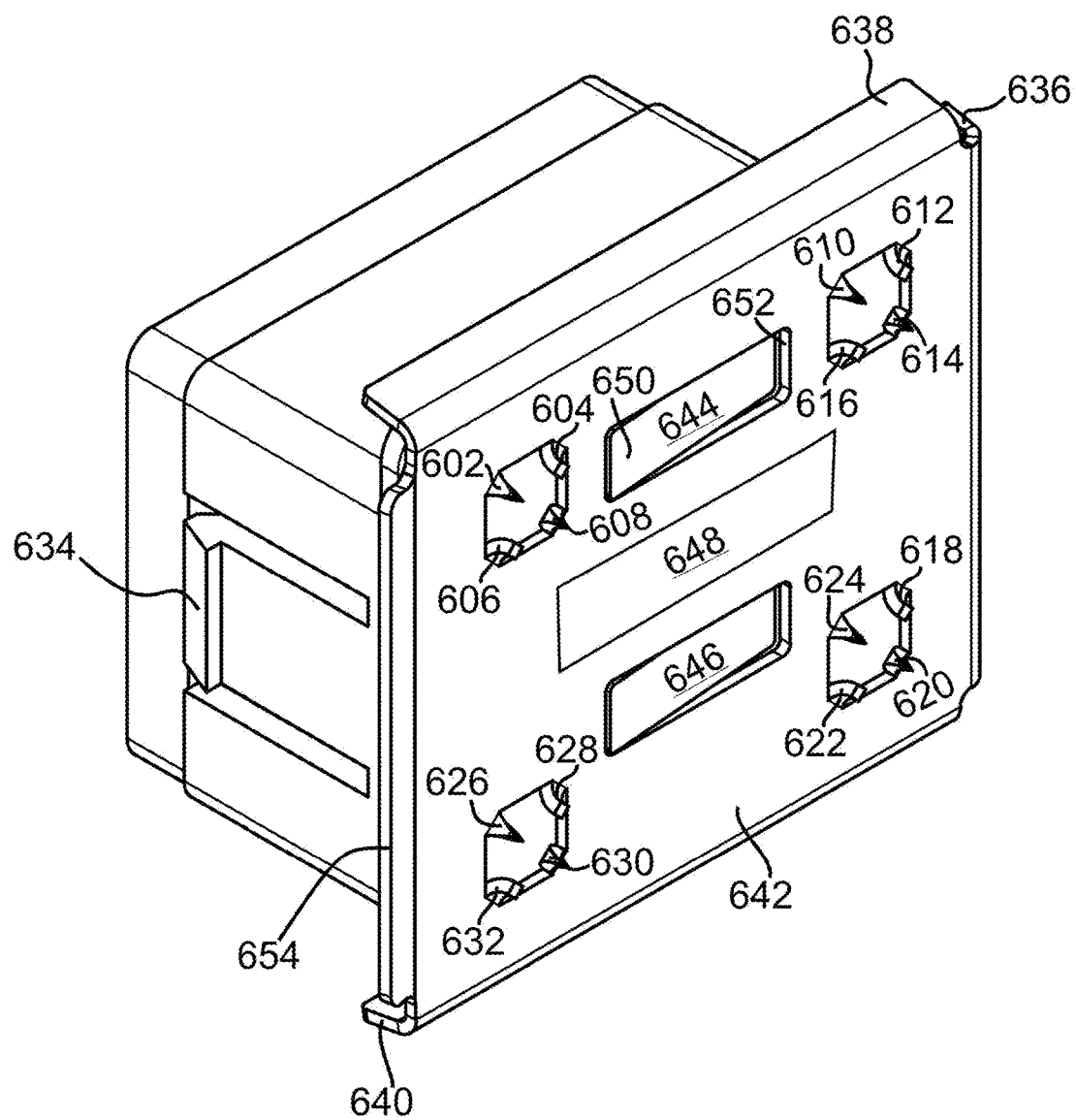
FIG. 6 shows a perspective view of an end cap assembly in accordance with an embodiment of the invention.

In FIG. 6, the mounting bracket 642 may be coated with an adhesive 648 to adhere the mounting bracket 642 to a window casing. The mounting bracket 642 is also configured with one or more spikes, barbs, or cleats 602-623, to penetrate the window casing 102 and prevent slippage between the window casing 102 and the window covering headrail. Recesses 652 may engage a protruding portion 650 of slide locks 644 and 646. The slide locks provide a way to keep the headrail of FIG. 1B from slipping forward within mounting brackets 642 when the headrail is in an installed state 120, of FIG. 1B. When the headrail is in an uninstalled state 114, of FIG. 1A, slide locks 644 and 646 disengage the mounting bracket at 650 allowing the headrail to slide out of the mounting brackets 642. Mounting bracket 642 may include three angled sides 638, 636, and 640 which allow the mounting bracket 642 to slide in and out of a window casing. An end cap compliant member 634 may provide necessary resistance to secure a first or second end cap to a headrail of a window covering.

Figure 7:
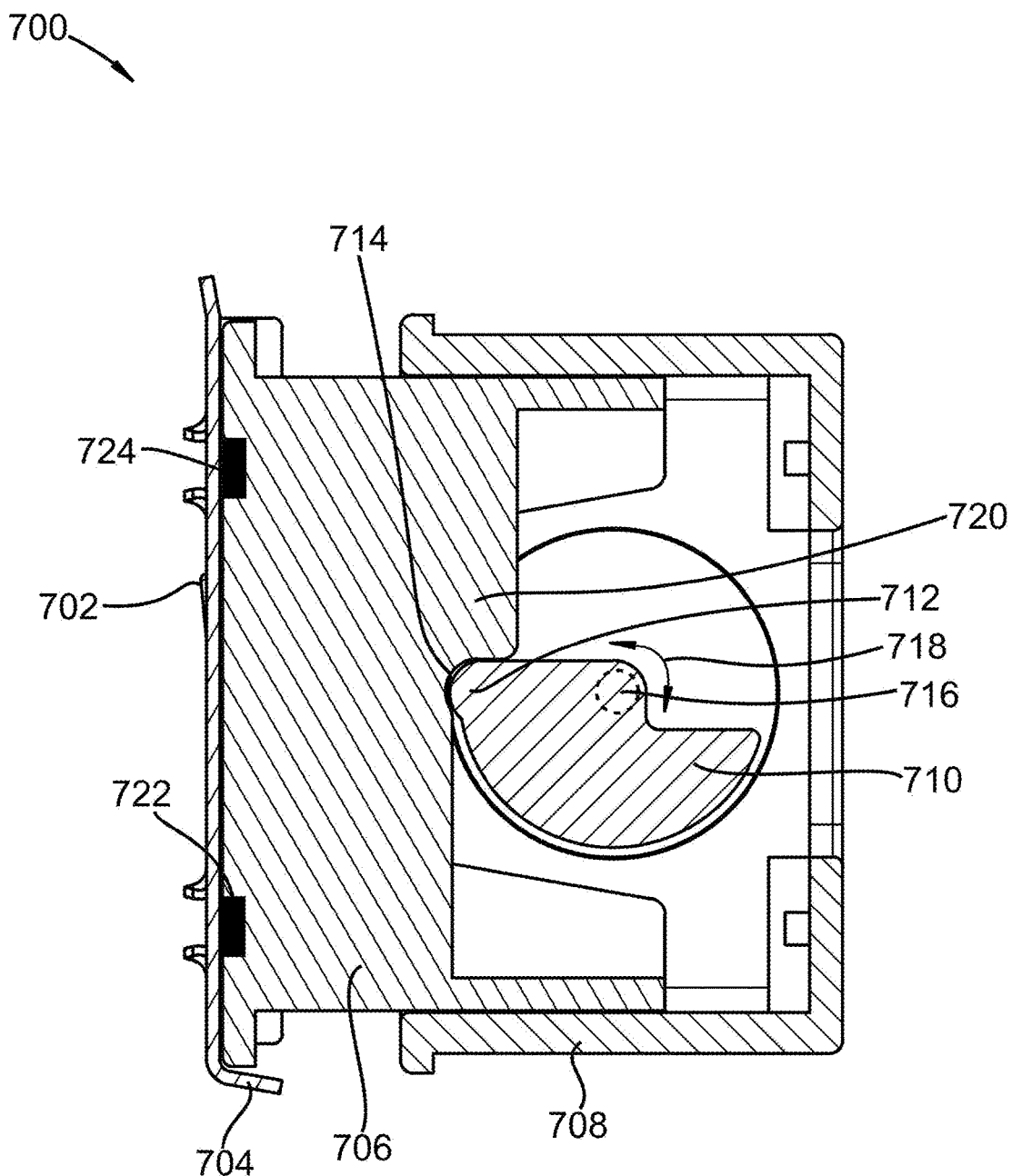
FIG. 7 shows a cross-sectional view of an end cap assembly in accordance with an embodiment of the invention.

In FIG. 7, a cross-section of an end cap assembly 700 is shown in an installed rotational position 718. Rotational cam 710 has a bump 712 which is received into groove 714. A lever arm may be attached to an axis of rotation 716. The end cap assembly 700 contains an outer member 708, a piston 706, a cam member 710, and a mounting bracket 704. As cam member 706 is rotated around an axis of rotation 716, cam member 710 pushes first piston 706 away from outer member 708 resulting in an extending of piston 706 and locking bump 712 into groove 714. Piston 706 may, in certain embodiments, slide into a first end of a headrail. The end cap assembly may be sized to fit snugly within a headrail. As cam 710 is rotated 718 around axis of rotation 716, piston 706 is extended away from the cam 710. One or more magnets 724 and 722 may be embedded into piston 706 or be near a front surface of piston 706. The magnets 724 and 722 may be used to attract and hold, by magnetic force, mounting bracket 704 while the headrail is installed. Mounting bracket 704 may include protrusions for entering a surface of a window casing. The mounting bracket may be made of a ferrous material such as iron or an alloy containing iron.

Figure 8:
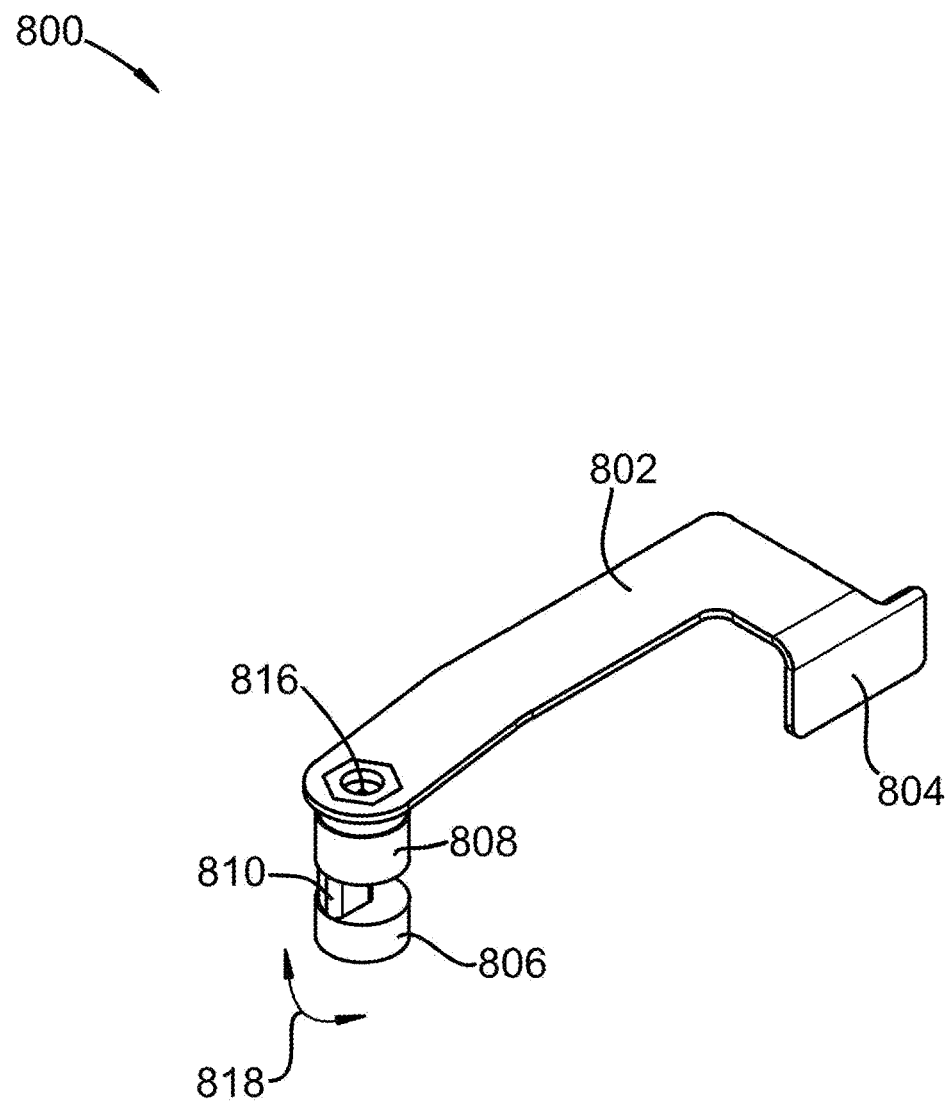
FIG. 8 shows a cam and lever arm of an end cap assembly in accordance with an embodiment of the invention.

In FIG. 8, a lever arm 800 is shown connected to a rotational cam member 806. The rotational cam member 806 may comprise circular bearing portions 808 on the side of a middle cam section 810. Middle cam section 810 may have a bump for locking the lever arm in an installed position substantially parallel to a headrail of a window covering. The lever arm may comprise a face portion 804 and an arm portion 802. The face portion 804 may be connected to arm portion 802 forming a 90-degree angle. As the lever arm is rotated, a first end cap assembly attached to a first end of a headrail of a window covering extends while a second end cap assembly attached to a second end of the headrail of a window covering compresses to create a compression fit between the headrail and the window covering.

Figure 9:
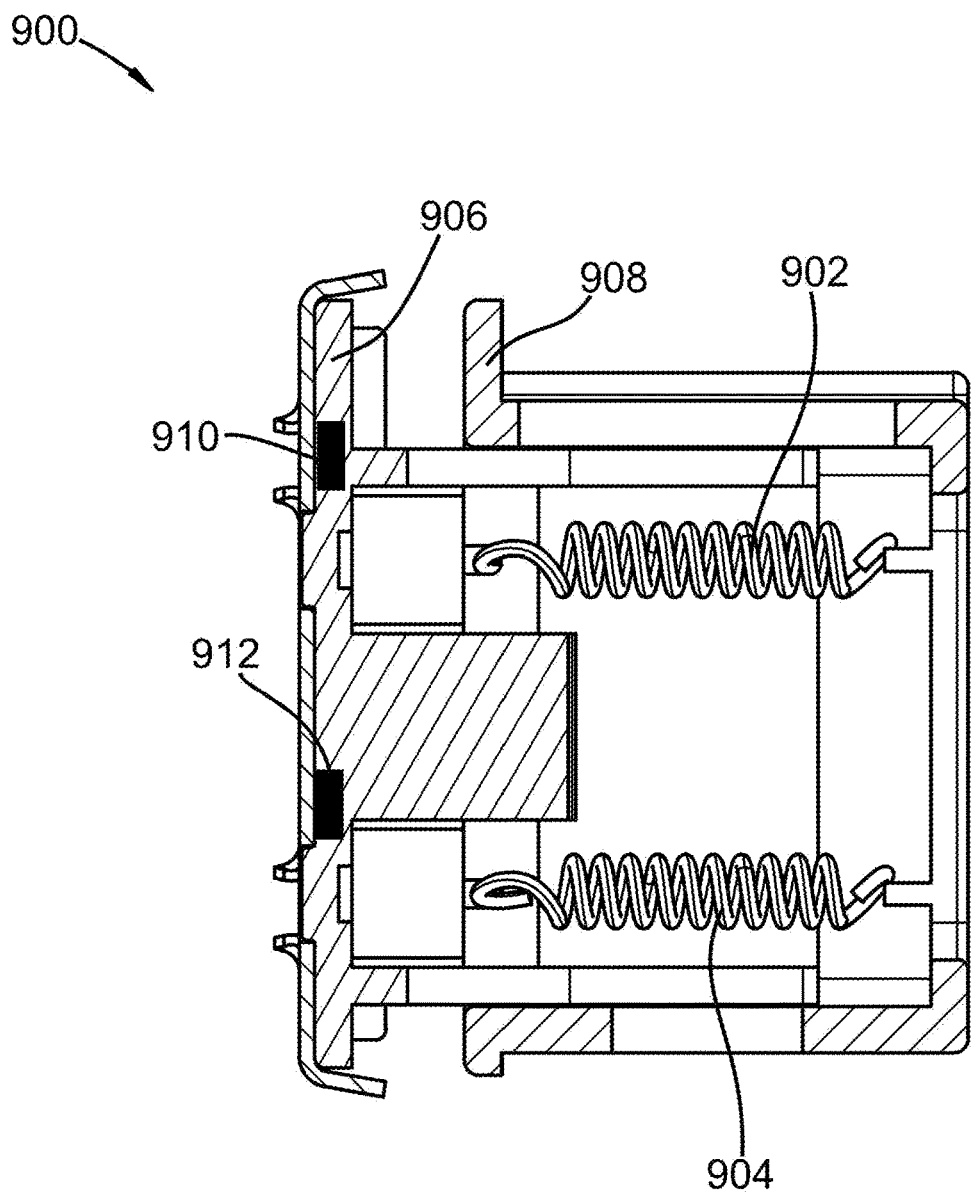
FIG. 9 shows a cross-sectional view of an end cap assembly in accordance with an embodiment of the invention.

In FIG. 9, a first end cap assembly 900 is shown which corresponds to a different view of the first end cap assembly of FIG. 7. Return springs 902 and 904 are shown connected to the piston 906 and to outer member 908. The function of the return springs is to retract the piston member when the lever arm is rotated in an uninstalled position. Magnets 910 and 912 are also shown. One or more springs 902 and 904 may be used to retract the piston depending on the size or scale of the headrail.

Figure 10:
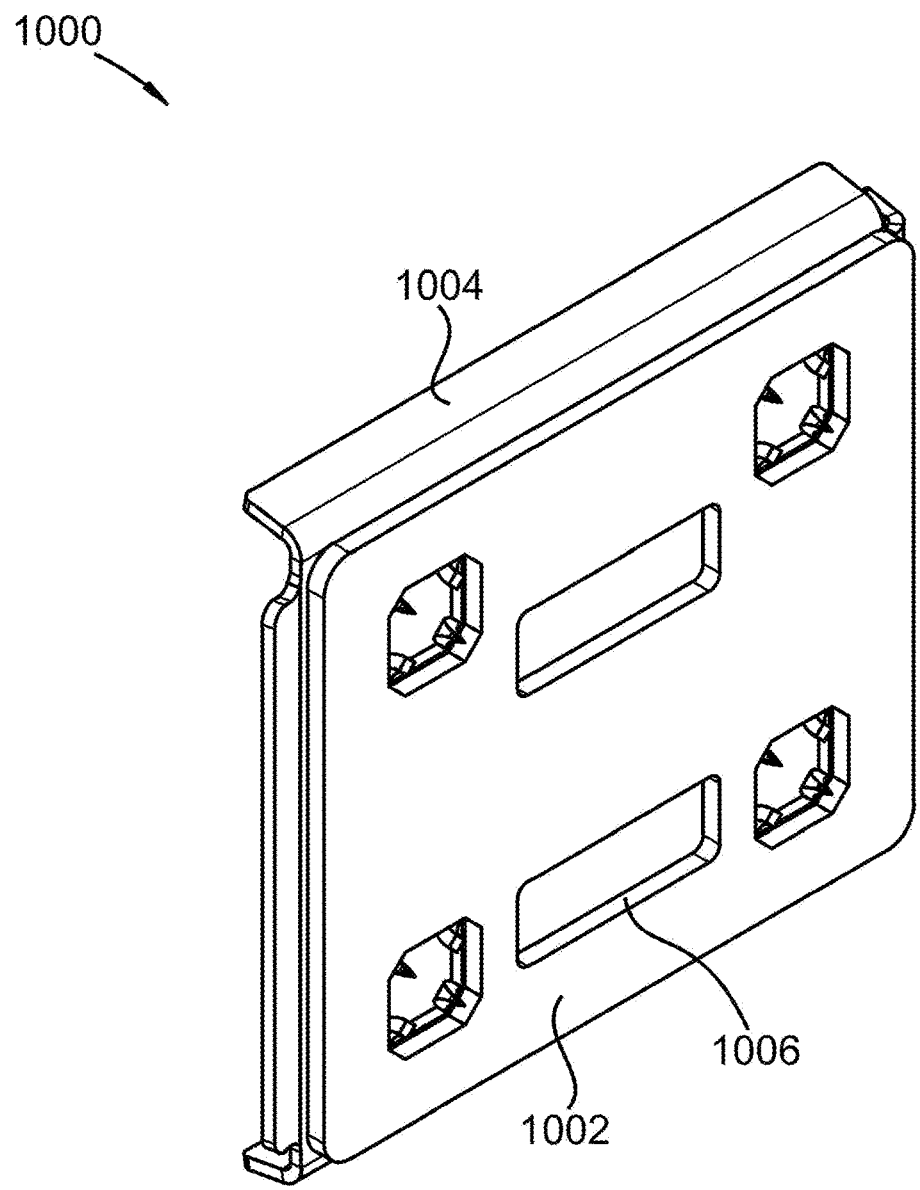
FIG. 10 is a perspective view showing a mounting bracket with an adhesive strip in accordance with an embodiment of the invention.

FIG. 10 is an isometric view 1000 of a mounting bracket. The spikes, barbs, or cleats are provided in a circular configuration on the mounting bracket 1004, although other patterns are also possible. The illustrated configuration allows the mounting bracket 1004 and associated spikes, barbs, or cleats to be fabricated from stamped sheet metal, although other materials and fabrication techniques may also be used. The mounting bracket 1004 may be coated with an adhesive 1002 to adhere the mounting bracket 1004 to a window casing. The adhesive 1002 may substantially cover an entire planar surface of mounting bracket 1004.

Figure 11:
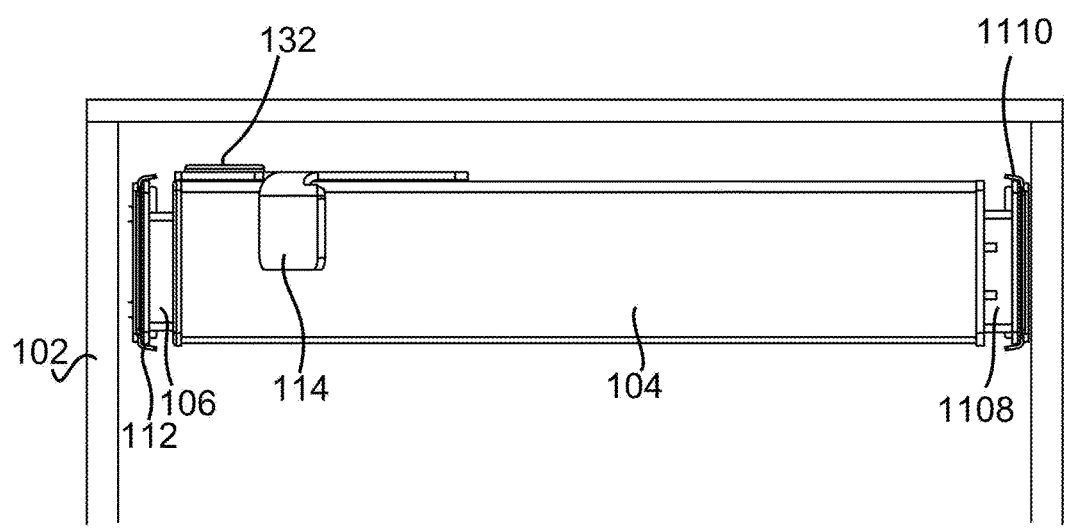
FIG. 11 is a front view of an uninstalled window covering in accordance with an embodiment of the invention.

FIG. 11 is a front view 100 of an uninstalled window covering with headrail 104, a first end cap assembly 106 and a second end cap assembly 1108. In this embodiment, the first end cap assembly 106 is coupled to a first end of head rail 104 and the second end cap assembly 1108 is coupled to a second end of headrail 104. The first end cap assembly 106 is configured to retain the headrail 104 within a window casing 102 by creating a compression fit between the headrail 104 and the window casing 102. The first end cap assembly 106 is configured to extend a piston relative to the second end cap assembly 108 of the headrail 104 in order to create a compression fit against the inside of the window casing 102. Lever arm 114 may be connected to a rotational cam member 132 with in the first end cap assembly. Lever arm 114 is shown in an open position or uninstalled position. When lever arm 114 is in an open position, the second end cap assembly 1108 is not compressed and the first end cap assembly is not extended. In this embodiment, only the first end cap assembly 106 comprises a piston creating compressive forces against the window casing 102 and forcing both brackets 112 and 1110 into the sidewalls of the window casing. The second end cap assembly 1108 does not have a piston, or camshaft or any other mechanisms to provide compressive forces to the apparatus.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for installing a headrail of a window covering comprising:
    one or more end cap assemblies attached to one or more ends of the headrail of the window covering;
    one or more rotational members to, upon rotation, extend one or more pistons of the one or more end cap assemblies, extending the overall length of the headrail and end cap assemblies, creating a compression fit between the headrail and two sides of a window casing;
    one or more nesting spacers residing within the one or more end cap assemblies allowing adjustment of headrail length;
    the one or more end cap assemblies further comprising one or more spacer alignment structures providing a channel aligning the one or more nesting spacers;
    a first alignment indicator on one or more of the end cap assemblies indicating the headrail is under a low compression state requiring adding one or more nesting spacers;
    a second alignment indicator on one or more of the end cap assemblies indicating the headrail is within a medium compression range not requiring addition or removal of the nesting spacers; and
    a third alignment indicator on one or more of the end cap assemblies indicating the headrail is under a high compression state requiring removal of one or more nesting spacers.

2. The apparatus of claim 1, wherein a portion of the one or more end cap assemblies slide into and out of one or more mounting brackets.

3. The apparatus of claim 2, wherein the one or more end cap assemblies are held to the one or more mounting brackets by one or more magnets.

4. The apparatus of claim 2, wherein the one or more end cap assemblies lock into one of the one or more mounting brackets when the one or more pistons are pressed between the window casing.

5. The apparatus of claim 1, wherein the one or more rotational members are connected to one or more lever arms.

6. The apparatus of claim 5, wherein the one or more lever arms comprise a face portion connected to an arm portion forming a 90 degree angle therebetween.

7. The apparatus of claim 1, wherein the one or more rotational members comprise a rotational cam.

8. The apparatus of claim 2, wherein the one or more mounting brackets comprise one or more of spikes, barbs, cleats, and adhesive strips.

9. The apparatus of claim 2, wherein the one or more mounting brackets remain in place on the window casing after removal of the headrail and window covering.

10. The apparatus of claim 7, wherein the rotational cam further comprises circular bearings on each side of a middle cam section.

11. The apparatus of claim 8, wherein the one or more mounting brackets each comprise at least two spikes, barbs, or cleats, positioned at different angles relative to each other.

12. The apparatus of claim 1, wherein the one or more end cap assemblies further comprise one or more compressible members.

13. The apparatus of claim 12, wherein the one or more compressible members are selected from one or more of springs, foam, compliant springs, pistons, or compressible material.

14. The apparatus of claim 2, wherein the one or more mounting brackets are made of ferrous material.

15. The apparatus of claim 1, wherein the first alignment indicator, second alignment indicator, and third alignment indicator visibly show the compression of the headrail by the one or more end cap assemblies partially obscuring one or more of the alignment indicators, revealing one or more indicators based on the amount of compression of the headrail and end cap assemblies.

16. The apparatus of claim 1, wherein the first alignment indicator, second alignment indicator, and third alignment indicator each comprise a unique audible indicator.

17. The apparatus of claim 5, wherein the one or more lever arms are rotated substantially 90 degrees to install the headrail in the window casing.

18. The apparatus of claim 8, wherein the one or more rotational members press at least one of spikes, barbs, and cleats, incorporated into the one or more mounting brackets into the window casing when rotated.

19. An apparatus for installing a headrail of a window covering comprising:
    a first end cap assembly attached to a first end of a headrail of the window covering;
    a second end cap assembly attached to a second end of the headrail of the window covering; and
    the first end cap assembly further comprising a rotational member to, upon rotation, extend a piston of the first end cap assembly against a first side of a window casing creating a compression fit between the headrail and two sides of a window casing.

20. The apparatus of claim 1, wherein the spacers comprise a substantially U shape corresponding to the shape of the headrail.

\* \* \* \* \*